N. B. Tyler,
Saw Set.
No. 93,648. Patented Aug. 10, 1869.
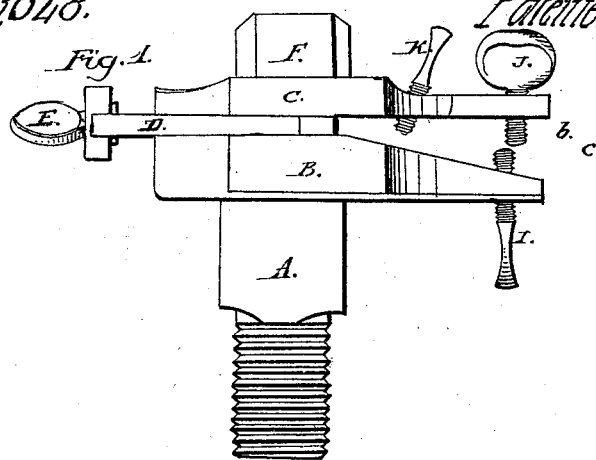
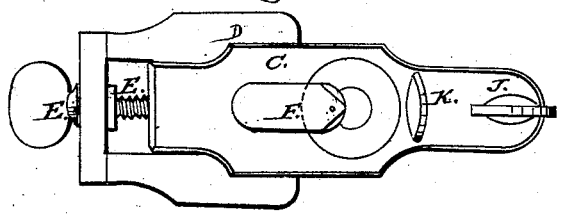
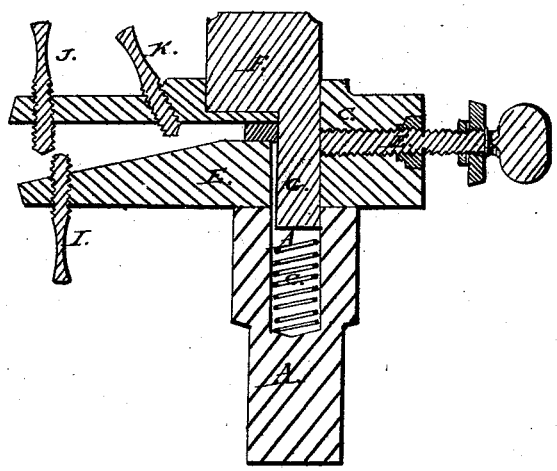
Witnesses:
J.W. Brundge
Frank S. Alden
Inventor:
N. B. Tyler

United States Patent Office.

NATHAN B. TYLER, OF WARREN, OHIO.

Letters Patent No. 93,648, dated August 10, 1869.

IMPROVEMENT IN SAW-SET.

The Schedule referred to in these Letters Patent and making part of the same.

*To all whom it may concern:*

Be it known that I, NATHAN B. TYLER, of Warren, in the county of Trumbull, and State of Ohio, have invented certain new and useful Improvements in Saw-Sets; and I do hereby declare that the following is a full and complete description of the same, reference being had to the accompanying drawings, making part of this specification, in which—

Figure 1 is a side view of the set.
Figure 2, a top view.
Figure 3, a vertical section.

Like letters of reference refer to like parts in the different views.

This invention relates to a saw-set, the construction and arrangement of which being such that the saw is held so that it cannot spring while being set; also being susceptible of adjustment, so that very fine and coarse saws can be set with the same implement.

F, fig. 3, is the hammer, the lower end or stem, G, of which is rounded and fitted closely in a hole or socket, H, sunk in the shank. In the bottom of said hole is a spring, G', whereby the hammer is thrown back after the blow is given upon it for setting the saw-tooth.

It will be observed that the face $a$ of the hammer is angular, thereby corresponding to the shape of the saw-tooth.

Having thus described the construction and arrangement of the saw-set, the practical operation of the same is as follows, viz:

The saw is placed transversely between the jaws B C, so that the teeth of the same will range under the hammer at the point $a$, fig. 1.

The guide D is adjusted so that the points of the teeth will touch it, thereby bringing each tooth equally in length under the hammer, which will vary according to the fineness of the saw to be operated upon.

The degree of set to be given is regulated by the adjusting-screw I, on which the back of the saw rests. Thus, if much set is required, the screw is turned down, thereby adjusting the saw, so that it will be depressed, more or less, from the horizontal line $b$, and as indicated by the dotted line $c$.

The amount of set being determined, the screws J K are then turned down near to the saw, leaving it free to slide between them, but without any vertical movement.

The saw thus adjusted, the hammer is then given a smart blow with a mallet, forcing it down upon the tooth beneath, which will thereby receive the proper degree of set.

The hammer is forced back by the resiliency of the spring G', and the saw moved along another tooth, and so on until the teeth are all set, which will be equally alike, as each tooth is adjusted under the hammer to the same extent, and thereby must have a uniformity throughout.

It will be obvious that by this device all the teeth will and must have a uniformity of set not attainable by the use of the ordinary set.

What I claim as my improvement, and desire to secure by Letters Patent, is—

The combination of the two jaws, B and C, having their set-screws J, K, and I, adjusting-gauge D, and hammer-set F, when constructed and arranged together, to form a saw-set, substantially as described.

NATHAN B. TYLER.

Witnesses:
J. H. BURRIDGE,
E. E. WAITE.